(12) United States Patent
Machajewski (10) Patent No.: US 10,026,331 B2
(45) Date of Patent: Jul. 17, 2018

(54) EDUCATIONAL GAMIFICATION SYSTEM AND GAMEFUL TEACHING PROCESS

(71) Applicant: Szymon Tomasz Machajewski, Saranac, MI (US)

(72) Inventor: Szymon Machajewski, Saranac, MI (US)

(73) Assignee: Syzmon Machajewski MI (US)

( * ) Notice: Subject to any disclaimer, the term of this patent is extended or adjusted under 35 U.S.C. 154(b) by 146 days.

(21) Appl. No.: 14/922,321

(22) Filed: Oct. 26, 2015

(65) Prior Publication Data
US 2017/0116872 A1   Apr. 27, 2017

(51) Int. Cl.
*G09B 7/00* (2006.01)
*G09B 5/02* (2006.01)

(52) U.S. Cl.
CPC .............. *G09B 7/00* (2013.01); *G09B 5/02* (2013.01)

(58) Field of Classification Search
None
See application file for complete search history.

(56) References Cited

U.S. PATENT DOCUMENTS

| | | | | |
|---|---|---|---|---|
| 6,729,884 B1* | 5/2004 | Kelton | ............... | G09B 23/28 434/236 |
| 7,402,105 B1* | 7/2008 | Hutter | ............... | A63F 13/12 434/128 |
| 8,016,680 B1* | 9/2011 | Hutter | ............... | A63F 13/67 434/128 |
| 2004/0091846 A1* | 5/2004 | Aughenbaugh | ...... | G09B 7/02 434/350 |
| 2012/0122066 A1* | 5/2012 | Dohring | ............ | G09B 5/06 434/308 |
| 2013/0011822 A1* | 1/2013 | Messner | ............ | G09B 5/06 434/365 |
| 2017/0004718 A1* | 1/2017 | Kern | ............... | G09B 5/06 |

\* cited by examiner

*Primary Examiner* — Sunit Pandya (57) ABSTRACT

Systems and methods are provided for designing and shaping student experience in an academic course by using a server system and a plurality of remote mobile devices. The educational experience design system registers completion of challenges by text completion codes or quick response bar code reader located on the mobile device processor to credit experience points or debit experience points to purchase course privileges. The course instructor specifies challenge completion codes originating in a plurality of sources resulting in an immersive feedback learning environment. The educational experience design system updates data from external peer instruction systems and from external content systems. The immersive feedback environment, based on open-ended earning of experience points, as well as spending such experience points, shapes student experience in the course based on intrinsic motivation theories.

1 Claim, 7 Drawing Sheets

Game player profile.

Figure 1. Game player profile.

Figure 2: Game player profile lower part of the screen after scrolling down

Figure 3: Game player profile advanced in the game displaying achievements

Figure 4: Game player profile after selecting "Make a request here" link in "Mentorship of late assignments achievement"

Figure 5. Game code claiming screen:

Figure 6: Available game missions screen customizable per course. (full view available in Fig. 11):

Figure 7. Game leaderboard displaying the current player with a right margin mark and the nearby players. All players can be displayed by using the Show All Players button.

Figure 8. List of missions completed by the user.

Figure 9. List of missions still available to the user.

Figure 10. List of codes or attempts entered by the user:

Figure 11. List of customizable missions for a specific course. Missions 1-6.

Figure 12. List of customizable missions for a specific course. Missions 7-11.

BRIEF DESCRIPTION OF THE DRAWINGS is available in the specification file.

EDUCATIONAL GAMIFICATION SYSTEM AND GAMEFUL TEACHING PROCESS

BACKGROUND OF THE INVENTION

The present invention is in the technical field of education and technology. More particularly, the present invention is in the technical field of software design and process design.

Teaching classroom and online courses is often based on the process of explanation and lecturing. The availability of YouTube and other Internet content creates competition to classroom explanation and, in some courses, makes classroom explanation no longer necessary. When students are motivated to learn in the classroom, they have plenty of openly available resources to transfer the knowledge itself and to construct it.

Theories of constructivism support the idea that in order to assimilate new content the learner needs to be motivated. So, a part of student success in learning is dependent on the emotional state of the student. Further, Benjamin Bloom in 1984 published a paper on Two Sigma Problem, which indicated that when proper teaching techniques are implemented students perform two standard deviations better than without those techniques. This provided evidence that teaching techniques do make a difference in the learning process. Bloom identified one-on-one instruction as the most successful teaching technique, echoing the approach of ancient tutors in Greece. Therefore, both the motivation of the student and the teaching techniques are important. The gamification system presented here allows for motivating the students and reaching out to a variety of personalized teaching techniques.

Technology today can be a bicycle of the mind for teachers to bring higher levels of effectiveness in teaching. There is room for improvement as laid out by Bloom. It is not simply that students are slow to learn. When teaching is aligned with student engagement and motivation teachers can be more effective. Gamification provides principles in this approach.

However, Gartner research noted that 80% of gamification efforts started in 2012 were to fail. This indicates that applying gamification is difficult. Just using leaderboards and using points often fails to accomplish the motivational goal. The point of my invention is to make gameful activities optional, just as learning is optional in any class already. The Educational Gamification System creates a wrapper of gameful activities for the classroom or online courses with no modification to standard curriculum given selected by administration for the class.

The gamification layer in turn allows for multiple paths of difficulty in the course to help students find flow between boredom and anxiety. The Educational Gamification System creates a background failure environment for students to try challenges, experiment, fail, and learn. Failure facilitates learning more efficiently than success. The exams and other graded activities typically focus on success and reward success. The goal of the gameful activities is to focus on re-do, on failure, and count units of progress.

While grades continue to be present and describe the level of achievement in required elements of the class, the gamification points allow for measuring effort, practice, and creation of safe-failure learning environment.

REFERENCES

Bloom, B. S. (1984). The two sigma problem: The search for methods of group instruction as effective as one-to-one tutoring. Educational Researcher.

Gartner, Inc. 2012. Gartner Says by 2014, 80 Percent of Current Gamified Applications Will Fail to Meet Business Objectives Primarily Due to Poor Design. Nov. 27, 2012. Retrieved Jun. 13, 2014, from http://www.gartner.com/newsroom/id/2251015

SUMMARY OF THE INVENTION

The present invention is a teaching process and software system including web infrastructure and mobile application. It is an educational process to engage students in exploration of a subject matter through gameful activities as a voluntary participation in playful learning.

BRIEF DESCRIPTION OF THE DRAWINGS (ATTACHED IN A SEPARATE APPLICATION FILE)

FIG. 10 is a view of game codes, both valid and invalid, that the user typed in.

DETAILED DESCRIPTION OF THE INVENTION

The invention, Educational Gamification System and Gameful Teaching Process, is a gamification process, which will fit any existing academic course. The curriculum itself and assessments will not be modified. Not modifying examinations or graded assignments maintains the traditional rigor of the course. Further, by keeping the learning objectives and assessments, the performance of students in the course can be compared with similar courses based on grades or other indicators. This way the gamification system is an add-on. The Educational Gamification System is optional to students in order to establish autonomy and open the possibility of the game to be enjoyable. This engenders emotion and opens up learning capacity. Participants collect points for completed missions, which can be any set of activities created by the instructor. These activities can be likened to extra credit assignments with the significant different in not counting directly towards the grade. Students who win the game do not automatically get a good grade in the class. While they do practice more, by completing missions, it would be reasonable to believe that their grades would be positively affected by doing well in the game. Since the game system is not directly related to grades, the pressure to complete the missions under some penalty is much more relaxed than that of grades. The rewards in the Educational Gamification System would be privileges in the course, not grades. Examples of the privileges may be purchasing opportunity to submit a late assignment, high position on the leaderboard, or fewer questions on an exam. The rewards focus on decreasing anxiety during exams instead of manipulating the grade itself.

Figure 1:
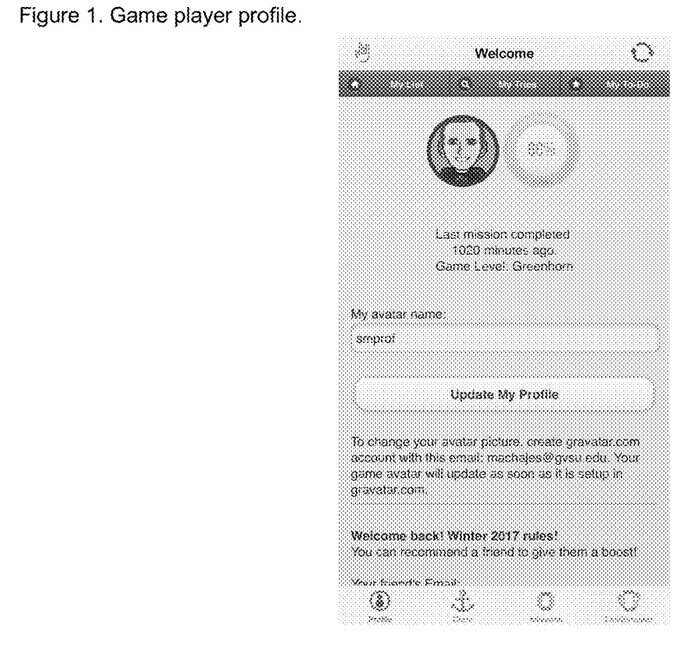
FIG. 1 is a view of the user game profile of the present invention showing user avatar, experience points, and a method to change the avatar name in the game for anonymity or personalization.

Referring now to the invention in more detail, in FIG. 1 there is shown the player profile, which is identified an email account. This allows practice systems, like textbook publisher web systems, Khan Academy, Codecademy and other Internet learning systems to integrate into the Educational Gamification System. The points can be associated with a particular profile. Credit for completion of the optional assignments counts toward the game, even if completion doesn't count toward the grade.

Figure 2:
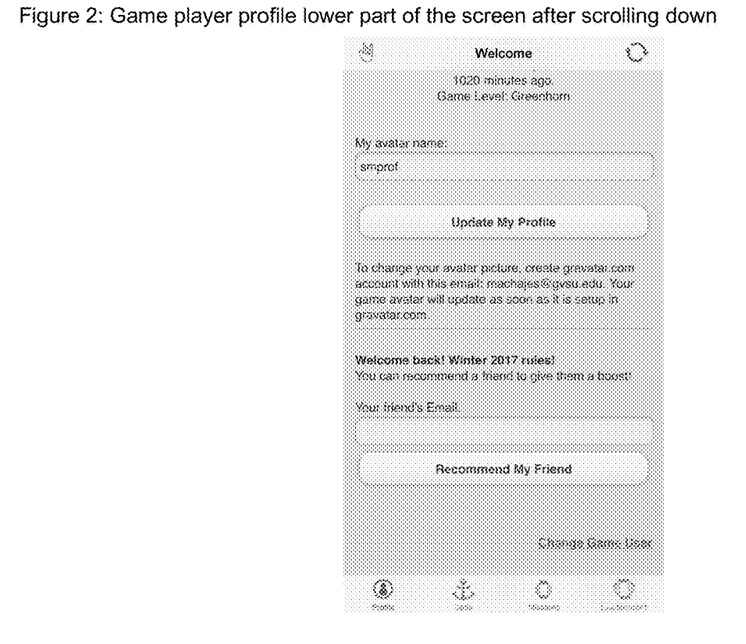
FIG. 2 is a view of user game profile after a scroll down on the screen displaying a method to recommend another player in order to enable late assignment privilege for that player.
Figure 3:
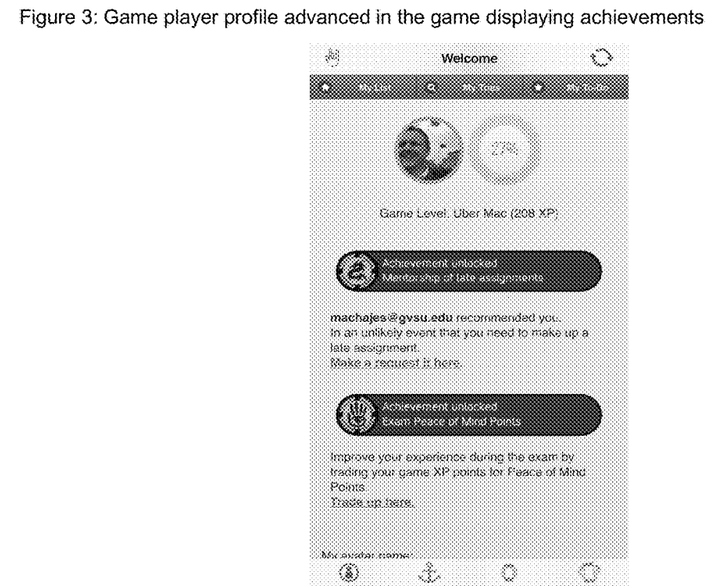
FIG. 3 is a view of the user game profile for a user, who advanced in the game. The profile displays achievements.
Figure 4:
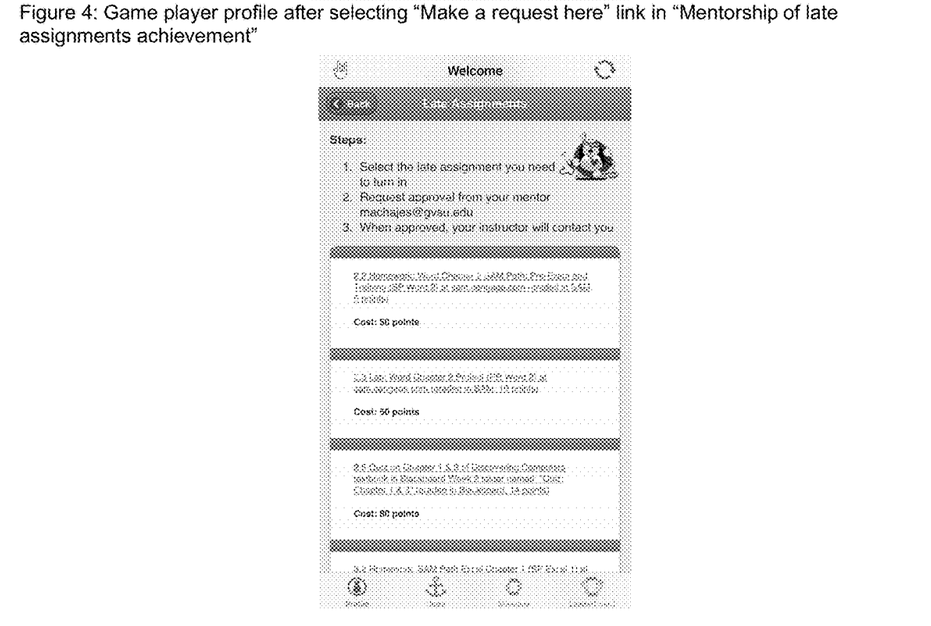
FIG. 4 is a view of the user game profile after the "Make a request here" link is selected in the "Mentorship of late assignments" achievement. A player can select a late assignment for make up process after paying specific amount of points.
Figure 5:
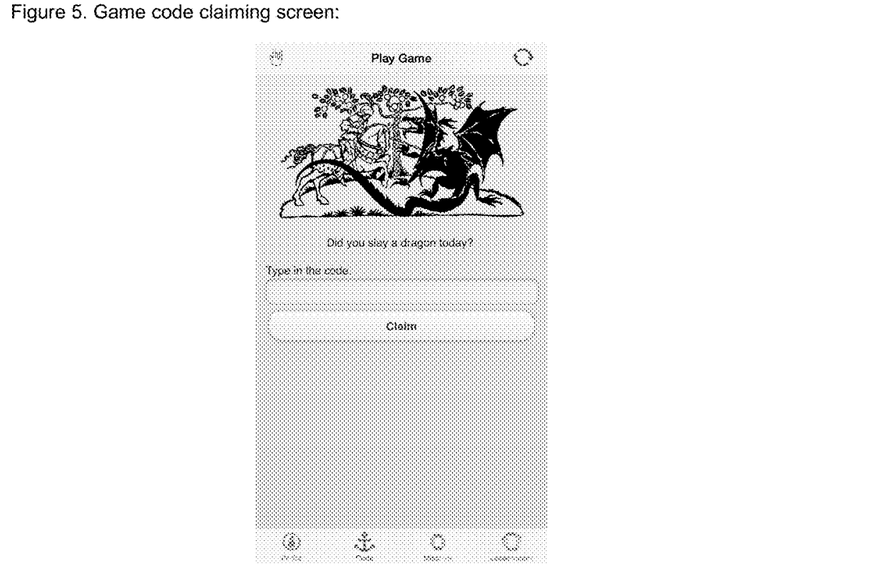
FIG. 5 is a view of the game code claiming screen, which allows to integrate mission completion from various learning sources. A player enters a text code, which was gained as part of the activity completion.
Figure 6:
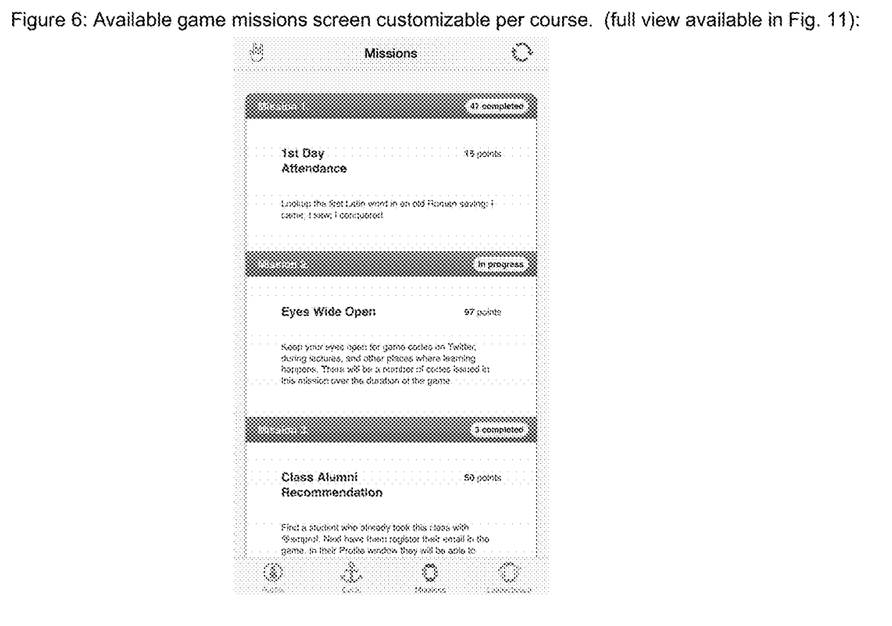
FIG. 6 is a view of a screen with all available missions. Such list outlines available activities and indicates the progress of others on these missions. Some missions are social in nature, like the requirement to find someone who already took the class in a previous semester. Such alumni student would recommend the current player and a mentorship relationship is created. This appeals to the socializer gamer personality. The variety of missions appeals to the explorer gamer personality.
Figure 7:
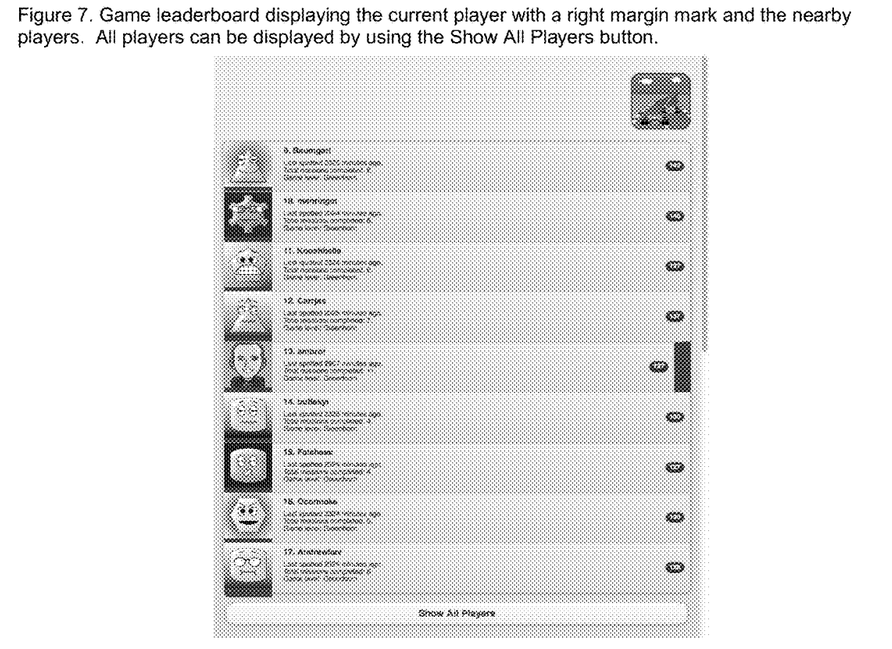
FIG. 7 is a view of the game leaderboard in default view showing the neighboring competitors. The leaderboard helps to address the achiever gamer personality. Full view of the leaderboard is also available.
Figure 8:
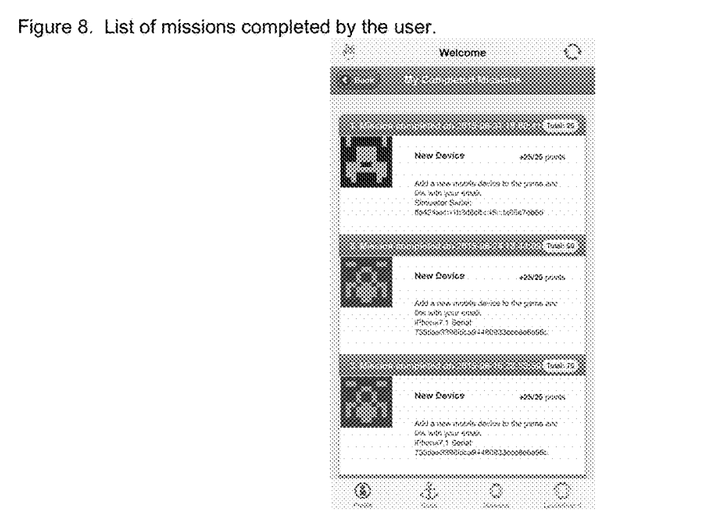
FIG. 8 is a view of the completed missions screen. This screen keeps the total of missions, which the user completed successfully.
Figure 9:
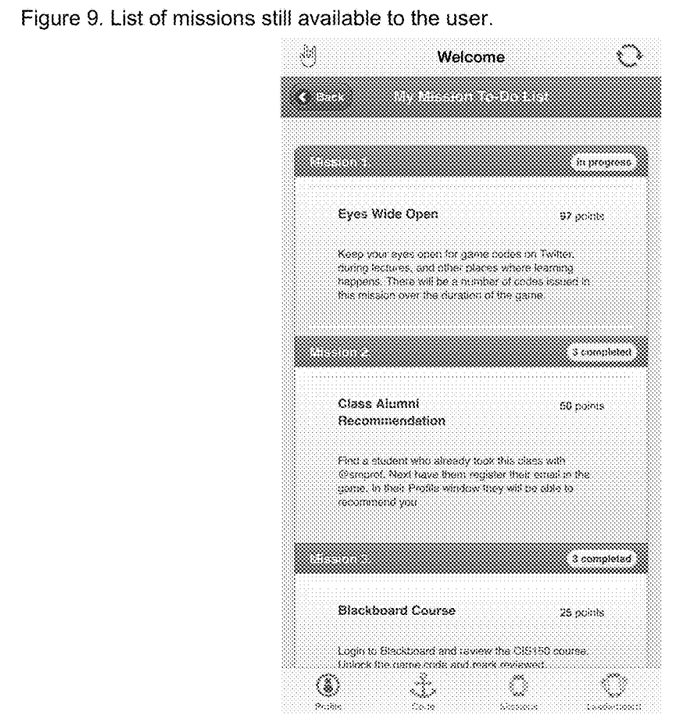
FIG. 9 is a view of the missions, which the logged in user can still complete.
Figure 10:
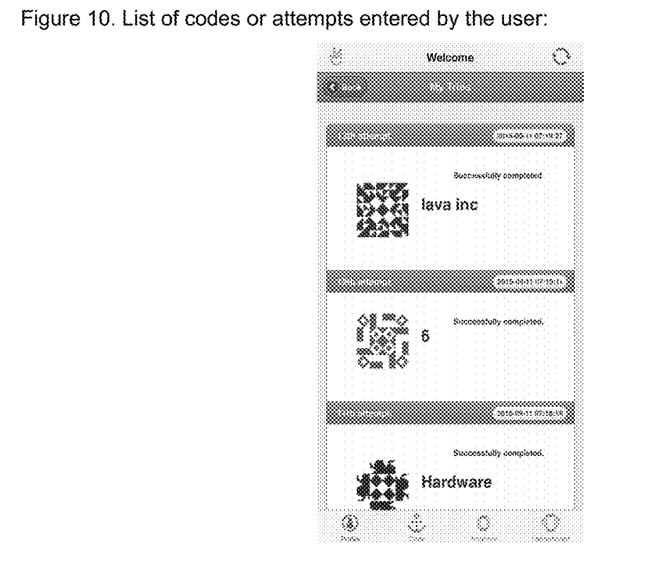
Figure 11:
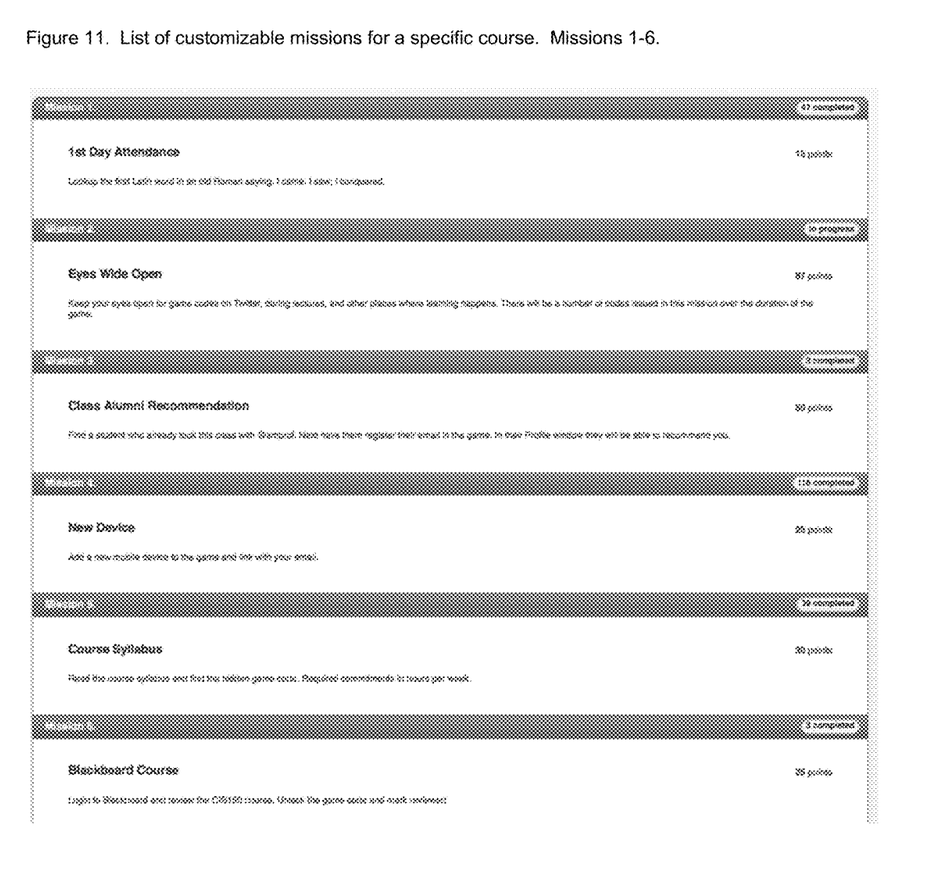
FIG. 11 is a view of full list of missions, which are customizable for a specific course by the course instructor.
Figure 12:
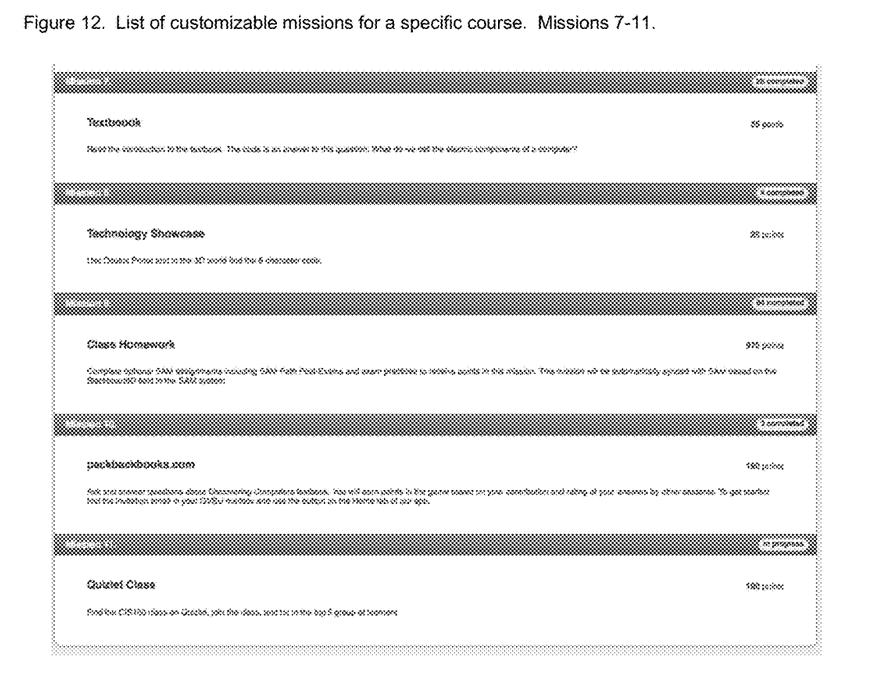
FIG. 12 is a view of full list of missions after a scroll down.

Referring now to the invention in more detail, in FIG. 2 there is shown the game code claiming screen. Each completed mission results in issuing a success code. Such code can be written on the blackboard during class or issued through adaptive release in, an external to the invention, Learning Management System upon completion of an electronic task. A game code can be further shared on social media or a mission can describe how to locate a game code in a textbook. Each game code carries a different weight of points. Some codes can be used only once by a specific person, other codes are shared across groups of players.

The invention is implemented in the mobile app and a web based system, but it could be implemented through other technologies as well as computer desktop application. The process of adding a new layer of low-stake status tracking, specifically game points, over the high stake school grades, creates a new dynamic in the class and encourages autonomy, mastery, and promotes students constructing their own meaning in the exploration of the subject matter.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An educational experience design and experience shaping system, comprising:
    instructor defines a mission, in the computer server system interfacing with a plurality of remote mobile devices, by providing the XP value, availability, and instructions for completion quantifying course extra credit through experience points (XP), which allows collection of any amount of XP by students to later determine their value in the course by specifying a purchase cost of course benefits maintaining the appropriate academic relation of extra credit to grades; a repository of transactions tracking and facilitating earning and spending of XP, to quantify digitally student experience during an academic course and creating a course currency with XP;
    instructions, executing on the computer server system, quantifying participation of students during in-person lectures by entering text codes, scanning quick response codes, or updating lecture peer-instruction data, similar to Kahoot!®, into the repository of experience points;
    instructions, executing on the computer server system, for displaying missions or challenges, leaderboard, achievements, peer-recommendations, boss-level missions;
    said instructions updating experience points based on activity in external in-person lecture peer-instruction systems and homework educational content systems similar to Blackboard Learn®, Duolingo, Kahoot!®, Cengage SAM®, and Pearson MyITLab®;
    said instructions implemented as a wrapper to existing courses in order to preserve and not modify course curriculum, assignment structure, assessment process of coordinated courses.

* * * * *

UNITED STATES PATENT AND TRADEMARK OFFICE
CERTIFICATE OF CORRECTION

PATENT NO. : 10,026,331 B2  
APPLICATION NO. : 14/922321  
DATED : July 17, 2018  
INVENTOR(S) : Szymon Machajewski

Page 1 of 1

It is certified that error appears in the above-identified patent and that said Letters Patent is hereby corrected as shown below:

On the Title Page

Item (73) Assignee: "Syzmon" should read as --Szymon--.

Signed and Sealed this
Thirtieth Day of April, 2019

Andrei Iancu
*Director of the United States Patent and Trademark Office*